Aug. 30, 1966  R. W. MOORE  3,269,532
SCREEN AND PNEUMATIC SEPARATOR
Filed March 29, 1962  2 Sheets-Sheet 1
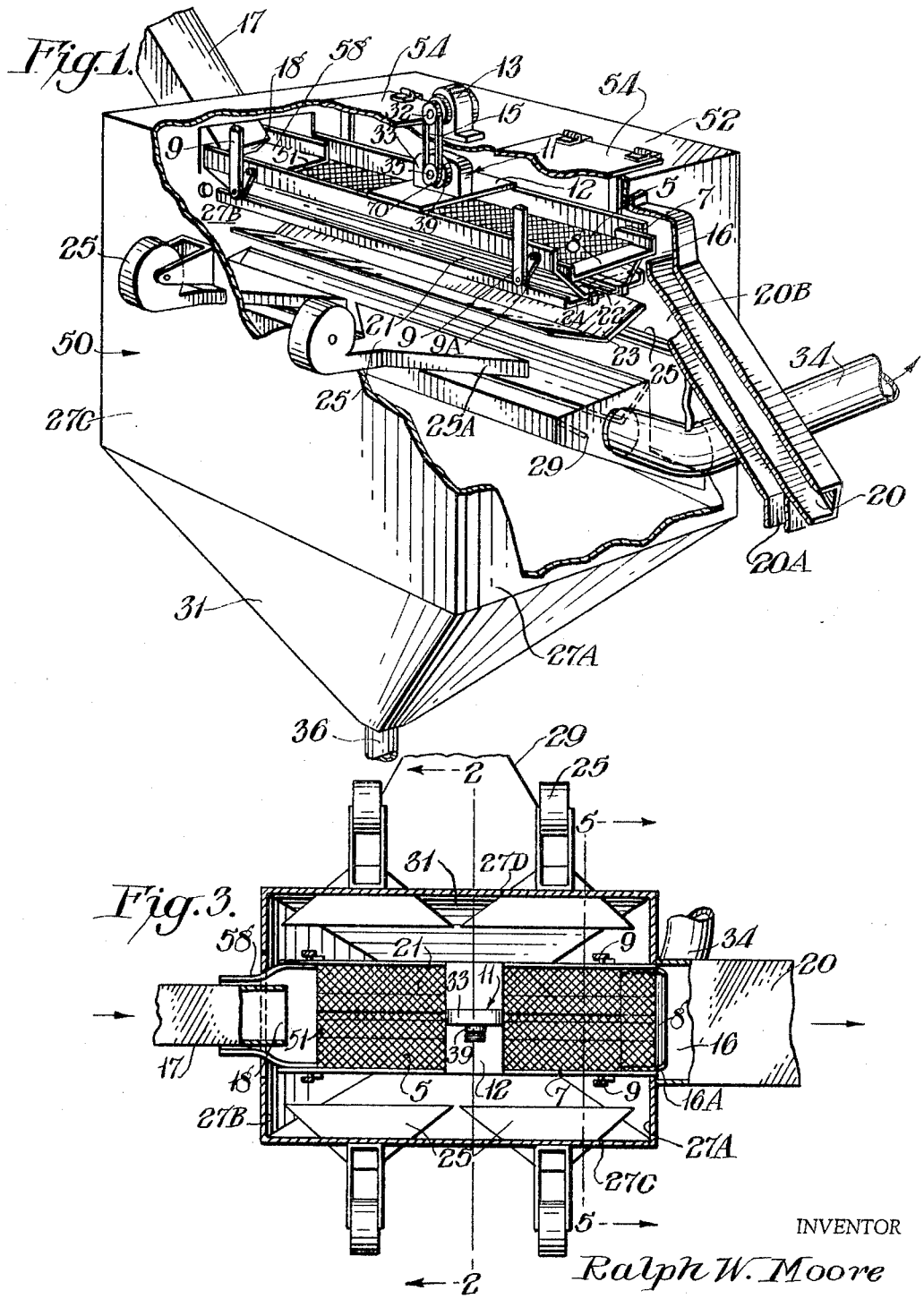
INVENTOR
Ralph W. Moore
BY Connolly and Hutz
ATTORNEYS Aug. 30, 1966  R. W. MOORE  3,269,532
SCREEN AND PNEUMATIC SEPARATOR
Filed March 29, 1962  2 Sheets-Sheet 2
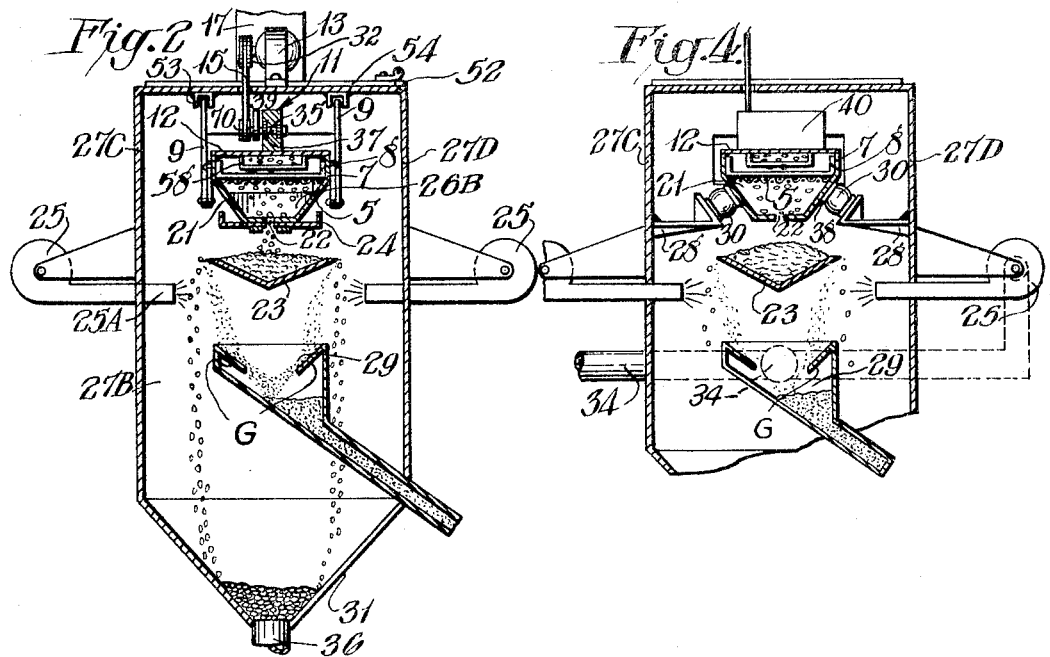
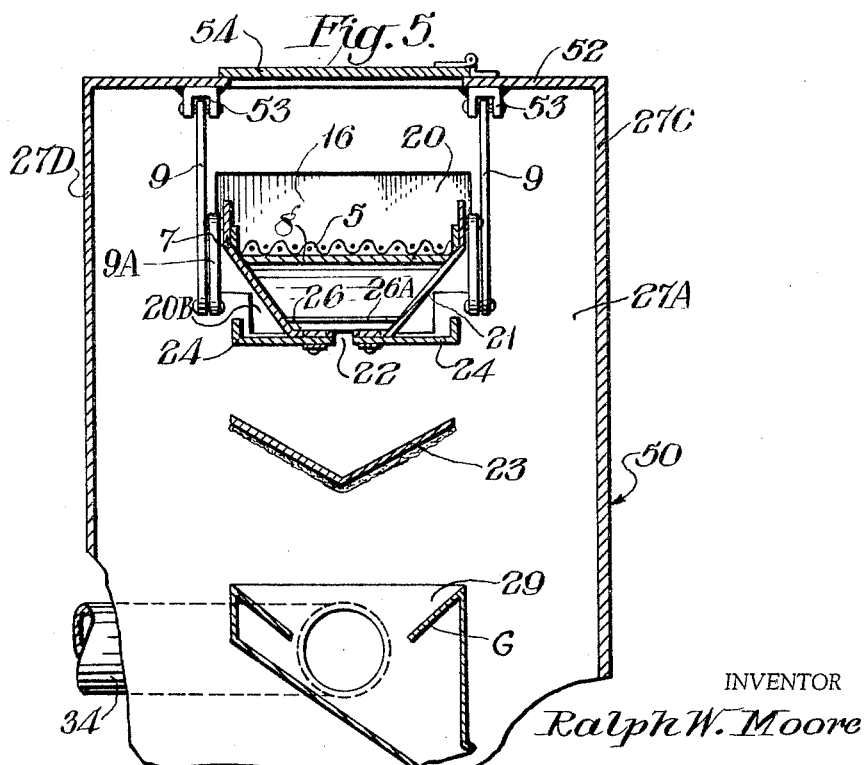
INVENTOR
Ralph W. Moore
BY Connolly and Hutz
ATTORNEYS

United States Patent Office 3,269,532
Patented August 30, 1966

3,269,532
SCREEN AND PNEUMATIC SEPARATOR
Ralph W. Moore, Hagerstown, Md., assignor to The Pangborn Corporation, Hagerstown, Md., a corporation of Delaware
Filed Mar. 29, 1962, Ser. No. 183,586
7 Claims. (Cl. 209—33)

This invention relates to a separating device for separating particulate matter, more particularly for such particles that are used in blasting equipment for cleaning, peening, abrading and the like.

Particle separating devices have been used with the above type of equipment for a considerable period of time, but are generally bulky and cumbersome. In addition, present separating devices operate by employing a strong negative pressure or vacuum and replace the displaced air by means of open ports or the like which direct the air along an intersecting pathway with respect to a stream or curtain of particles. This type of arrangement usually requires a relatively large exhaust system and, in addition, tends to be inefficient since it is difficult to obtain an even equal flow through all parts. Separating devices in present use are generally considered efficient if not more than 2% by weight of the separated particulate material is foreign matter. Such impurities substantially reduce the working life of throwing wheels and wheel vanes, sometimes by as much as 90% in the case of sand and similar impurities.

It is an object of the present invention to provide particle-separating devices that are more simple to construct and use, have greater efficiency, and a higher capacity per unit size.

It is a further object of the present invention to reduce the amount of impurities or foreign bodies in sorted particulate matter, particularly abrasive particulate matter, to below the 2% value heretofore considered satisfactory.

Other objects and a fuller understanding of the invention may be obtained by referring to the following description and claims, taken in conjunction with the accompanying drawings wherein:

FIG. 1 is a perspective partly broken away of a separator according to the present invention;

FIG. 2 is a vertical cross-section taken along line 2—2 of FIG. 3 of the separator of FIG. 1;

FIG. 3 is a plan view of the separator of FIGS. 1 and 2 with top removed;

FIG. 4 illustrates a modification of FIG 2; and

FIG. 5 is a cross-section taken along line 5—5 of FIG. 3.

In accordance with the present invention a vibrating positive-pressure device is employed for separating small particles from a stream containing these particles and also containing elongated foreign bodies such as wires having diameters close to those of the particles, said device having a screen with a mesh size suitable for passing the desired particles, vibrating means connected to the screen for vibrating it, and supply structure connected to deliver the stream to the screen so that it flows over the screen as the screen vibrates. An apron attached at one end of the screen receives the unsorted particles and feeds them to the screen, said apron being essentially arranged in a horizontal position for spreading the particles and causing wires or similar foreign bodies to settle to a tilt that approaches the horizontal, so that such foreign bodies move over the screen without falling through it, while the particulate matter is screened.

In addition, the apparatus can be made particularly compact by separating the fines from the heavier particles with a parallel arrangement of two curtain-type streams of the particles, using blowers to deflect the fines from both streams into the space between these streams.

With reference to FIGS. 1, 2 and 3, a preferred embodiment of the present invention is shown having sides 27A through D, a roof 52 with hinged service doors 54, and a vibratory screen 5.

The screen can consist of any abrasive-resistant heavy duty industrial screening material such as wire having a mesh size adapted to the particular purpose to which the separating device is applied. For general blasting purposes it should pass particles not substantially larger than about ⅛″ in diameter. It is conveniently fitted with a frame 7 having a top plate 12, side members, and a discharge extension 8. The frame, in turn, is suspended from roof 52 at convenient fixed pivot points 53 (FIG. 5) by links 9, 9A which permit the frame to vibrate up and down as well as to and fro. The links can hang free in extended manner, or as shown they can be urged toward a folded position as by coil springs (not shown).

Vibrating means such as a journal 11 (FIG. 1) carrying a rotatably mounted shaft 35 and an eccentrically rotatably-mounted weight 39, is connected to an electric motor 13 or other convenient source of rotational energy.

A convenient method for transmitting rotational movement to the weight 39 is shown as a belt 15 running from a driving wheel 32 on motor 13 to a driven wheel 70 keyed to the shaft 35.

It is helpful to keep the motor and drive elements shielded from the dust particles, particularly when abrasive particles are being treated, as by employing sealed bearings for movable drive and suspension parts, and also by mounting the motor 13 on roof 52 in the manner shown in FIG. 1.

Screen 5 is supplied with particles by feed duct 17 having outlet 18. An outlet only about 3 to 6 inches high is particularly useful in preventing wires or the like from entering the screening area in an upright or vertical position and passing through the mesh of the screen.

Duct opening 18 opens onto apron 58 which is secured to frame 7 and arranged in a generally horizontal position. As the stream of material to be separated is dropped onto the apron, it flows over its discharge lip 51 (FIGS. 1 and 3) onto the screen and across it. Coarse material too large to fall through the mesh of the screen is discarded through a coarse discharge port 16 by means of extension 8 secured to frame 7, and allowed to drop into coarse discharge chute 20.

Frame 7 also includes a distribution chamber 21 below the screen and having a slot 22 through which the particles dropping through the mesh of screen 5 are spread out in an elongated curtain to fall onto catch plate 23. Secured at both ends of distribution chamber 21, as shown in FIGS. 1, 2 and 5, are dams 26 and 26B, dam 26 being equipped with a lip extension 26A for handling overflow and directing it into overflow chute 20A through port 20B (FIG. 1). Chute 20A can empty into the recycling path of the blastant particles so that they can return for another passage through the separator.

Catch plate 23 is arranged beneath frame 7 and fixedly mounted in end walls 27A and 27B. This plate serves to split the screened particles into two parallel streams or curtains overflowing from both longitudinal edges.

Blowers 25 are conveniently mounted on both side walls 27C and 27D at a point beneath catch plate 23 and arranged to flow in generally horizontal direction transverse to the pathway of overflow particles falling from the trough. In this way dust and fines are displaced inwardly to be collected in fine hopper 29 having inwardly disposed guide plates G and the recoverable particles fall into recovery bin 31.

The blowers are preferably equipped with wide flat nozzles 25A for blowing a short wide jet of air which impinges in a uniform manner against the entire width of the particle curtains falling from trough 23. The blower nozzles are shown at the same level so that the air flow from one side does not extend to the curtain on the opposing side where it could have an undesired effect on the dropping particles.

Air is removed from the separator by means of conduit 34 which is shown as connected to the top of fine hopper 29. The conduit can have its remote end leading to any convenient suction device such as that forming part of the blasting equipment with which the separator is used.

The usable particles received in bin 31 are conveniently removed through recovery line 36 or any other suitable emptying device. The recovered particles can be recycled directly to the blasting operation.

The slot 22 at the bottom of distribution chamber 21 (Ref. FIGS. 1 and 2) can be made adjustable as by using one or two movable side plates 24 which can be slidably held against the floor of the distribution chamber. Such an arrangement may be conveniently and automatically operated by remote control, whereby slot 22 can be momentarily enlarged to clear any small obstruction or blockage which interrupts the feeding of screened particles onto plate 23.

Apparatus of the type described above is very effective for separating core wires and the like, and sand, from recycled blastant particles. By keeping the apron 58 horizontal, such wires are permitted to settle down to approach a horizontal position as they move across the apron. These wires are used in large quantities in present-day casting techniques to hold mold portions such as cores in place. Blasting operations are particularly desirable for cleaning up such castings and many of the cores, including core wires and the like which still adhere to the castings when they are loaded into the blasting machine. Provision is made in such machines to permit core wires that are separated from the castings to drop through gratings or similar devices so that they do not accumulate to jam the blasting apparatus. These wires accordingly are automatically removed from the blasting zone along with the blasting particles and have to be separated by a separate treatment. Blast projectors such as throwing wheels, are commonly used to project the blastant particles against the castings or other work pieces which are readily damaged or jammed by wires, and it is accordingly very important to completely remove the wires from the recycled blastant.

The generally horizontal position of the apron 58 along with the use of a shallow layer of entering particles on this apron assures the settling down of the wires. A suitable shallowness of layers can be anything up to about two or three inches. In such condition the mixture leaving the lip 51 of the apron 58 (Ref. FIGS. 1 and 3) has all its wires lying down so close to the horizontal that they move across the screen 5 without falling through its mesh. This happens whether the screen is merely vibrated in one dimension either up and down or to and fro, or it is gyrated in a circular or elliptical path, or even if it is subjected to vibration of the type that acts on the particles so as to propel them forward.

The use of a trough or catch plate to split the long thin curtain-like stream falling from slot 22 into two parallel elongated streams is a particularly desirable feature of the present invention. It enables the use of opposed air streams to provide the fines separation in an extremely compact manner. The horizontal separation between the split curtains should be between one and five feet. Less separation will cause both of the oppositely directed blown streams of air to interfere with each other before they produce the desired deflection of the fines and wider separation makes the entire apparatus so much more bulky as to defeat the compactness which the invention otherwise provides.

Chute 20A is an overflow for the trough 21 and is used to indicate that the trough is filled with particles along its entire length. A dam 26 (FIG. 5) at the overflow end of the trough helps to assure that particles move completely along the entire length of this trough so that there is a positive feed through all portions of slot 22. This gives the falling curtains of particles their greatest width and thereby increases the effectiveness of the separation.

FIG. 4 illustrates a modification of FIG. 2 in which frame 7 is mounted on brackets attached to side walls 27C and 27D by means of pneumatic cushions 30 conveniently bolted to brackets 28 and the sides 27C and 27D. In this construction, the vibrating device is shown as a self-contained actuator 40 such as electromagnets energized by the standard 60-cycle electric current, to produce an alternating magnetic field that vibrates the screen at a frequency of 120 cycles per second. Alternatively, the pneumatic cushions 30 can have their interiors connected to a source of pulsing pressure that causes the cushions to expand and contract and to correspondingly vibrate the frame 7. Limit stops or bumpers can be effectively used with such a pulsing technique, or with any other vibrating arrangements, to act as jars against which the frame 7 strikes as it is vibrated. This improves the screening action by increasing the severity of each vibration swing.

Because this unit is often preferably mounted near the top of a throwing wheel machine and as much as 20 to 30 feet above floor level, it is desirable to minimize the transmission of vibration from the screen to the support structure. Isolating the vibrating part of the unit preferably by air cushions accomplishes this result very efficiently.

It is another feature of the present invention that the amount of air blown in by means of blowers 25 is not so great as to overburden the suction equipment for the blasting chamber to which conduit 34 is normally connected. If desired, the amount of excess air blown in across the poured curtains can be reduced as by having the intakes of blowers 25 connected to the interior of the separator as indicated in FIG. 4. The blowers will then essentially recirculate air already present in the separator.

A single separator according to the present invention can have more than one delivery outlet 36. For this purpose the hopper shaped bin 31 can be divided into two or more small hopper-shaped compartments each having its own outlet. The individual outlets can be separately connected to different throwing wheels or the like for reblasting.

The trough 21 with its slotted floor need not be vibrated with the screen, and if desired, this trough can merely be fixed in place between the walls of the compartment.

Since it is obvious that many changes and modifications can be made in the above-described details without departing from the nature and spirit of the invention, it is to be understood that the invention is not to be limited to said details except as set forth in the appended claims.

What is claimed is:

1. A device for separating small particles from a stream containing these particles and also containing elongated foreign bodies having diameters close to those of the particles, said apparatus having a substantially horizontal screen with a mesh size suitable for passing the desired particles, vibrating means connected to the screen for vibrating it, supply structure connected to deliver the stream to the screen so that it flows over the screen as the screen vibrates, said supply structure including feed means for delivering the stream in a flat shallow layer, said screen having an attached apron for receiving the particles and feeding them onto the screen, said apron being arranged in a substantially horizontal position causing elongated foreign bodies deposited thereon to approach the horizontal and pass over said screen without falling through it, while the particles pass through as screened particles, pouring means below said screen connected to pour two parallel elongated narrow curtain type streams of said screened particles down through an open space, blower structure connected to blow air horizontally in said open space and across stream, said blower structure including a plurality of blowers facing each other the blown air moving from outside both streams to the zone between these streams, suction means having a suction inlet in said zone for exhausting the blown air, a pair of separator partitions below said open space to split the falling streams into lighter particles that are deflected into said zone by blown air, heavier particles that are not so deflected, a collector for collecting the deflected particles of both streams, and a collector for separately collecting the undeflected particles of both streams.

2. A device according to claim 1 in which said screen is mounted on a frame, said frame having downwardly extended sides arranged for funneling said screened particles onto said pouring means adapted for distributing said particles as a plurality of evenly-distributed curtains of particles.

3. A device according to claim 1 in which said blower structure is equipped with means for recirculating air from within said particle separator to said blower structure.

4. A device according to claim 1 wherein said pouring structure is a V-shaped trough, feed structure being below said screen and above said trough, said feed structure having downwardly converging sides, and said sides of said feed structure being spaced from each other to form a slot with said slot being disposed above the root of the V.

5. A device according to claim 4 wherein adjusting means are connected to said sides of said feed structure for controlling the size of said slot.

6. A device according to claim 1 wherein the intake of each of said blowers is disposed within said open space.

7. A device according to claim 1 wherein said feed means includes a flat feed duct having a longer width than its height, and said feed duct being disposed adjacent said apron for delivering the stream in a flat shallow layer.

References Cited by the Examiner

UNITED STATES PATENTS

| | | | |
|---|---|---|---|
| 82,431 | 9/1868 | Mills | 209—134 |
| 148,229 | 2/1874 | Mayers | 209—265 |
| 253,546 | 2/1882 | McNeil | 209—263 |
| 693,025 | 2/1902 | Jessup | 209—263 |
| 955,714 | 4/1910 | Steedman | 209—134 X |
| 2,866,547 | 12/1958 | Gladfelter | 209—135 X |
| 2,941,667 | 6/1960 | Hilgartner | 209—134 |
| 3,005,547 | 10/1961 | Freeman | 209—134 X |
| 3,036,708 | 5/1962 | Freeman | 209—134 |
| 3,087,615 | 4/1963 | Powell | 209—134 |

FRANK W. LUTTER, *Primary Examiner.*

RICHARD A. O'LEARY, *Examiner.*